US011010945B2

(12) United States Patent
Wei et al.

(10) Patent No.: US 11,010,945 B2
(45) Date of Patent: May 18, 2021

(54) AUGMENTED REALITY SYSTEM AND IMAGE DISPLAY METHOD THEREOF

(71) Applicants: LITE-ON ELECTRONICS (GUANGZHOU) LIMITED, Guangzhou (CN); Lite-On Technology Corporation, Taipei (TW)

(72) Inventors: Shou-Te Wei, Taipei (TW); Wei-Chih Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/164,818

(22) Filed: Oct. 19, 2018

(65) Prior Publication Data
US 2020/0005506 A1    Jan. 2, 2020

(30) Foreign Application Priority Data
Jun. 27, 2018  (CN) .......................... 201810678969.2

(51) Int. Cl.
*G06T 11/60*    (2006.01)
*G06T 11/00*    (2006.01)

(52) U.S. Cl.
CPC ............ *G06T 11/60* (2013.01); *G06T 11/001* (2013.01)

(58) Field of Classification Search
CPC ..... G06T 11/60; G06T 11/001; G06T 19/006; G06T 7/246; G06T 7/30; G06T 7/33; G06T 7/194; G06T 7/174; G06T 2215/16
See application file for complete search history.

(56) References Cited

U.S. PATENT DOCUMENTS

| 10,176,636 B1* | 1/2019 | Neustein .............. A41D 27/085 |
| 2012/0306918 A1* | 12/2012 | Suzuki ................ G06F 3/04845 345/633 |
| 2016/0155262 A1* | 6/2016 | Chen ...................... G06T 19/00 345/426 |

* cited by examiner

*Primary Examiner* — Ke Xiao
*Assistant Examiner* — Andrew Shin
(74) *Attorney, Agent, or Firm* — JCIPRNET

(57) ABSTRACT

The present invention provides an image display method applied to an augmented reality (AR) system which positions a virtual object by a marker image. The image display method includes that: a reality image is acquired, wherein the reality image includes a first image where the marker image is positioned and a second image, and the marker image includes a known pattern; the first image in the reality image is replaced with an extending image of the second image on the basis of a relationship between the known pattern and the first image to generate a display image; and the display image is displayed. Therefore, the condition that an AR image includes the marker image and thus the whole image looks unnatural may be avoided. In addition, the AR system using the foregoing method is also provided.

20 Claims, 6 Drawing Sheets

AUGMENTED REALITY SYSTEM AND IMAGE DISPLAY METHOD THEREOF

CROSS-REFERENCE TO RELATED APPLICATION

This application claims the priority benefit of China application serial no. 201810678969.2, filed on Jun. 27, 2018. The entirety of the above-mentioned patent application is hereby incorporated by reference herein and made a part of this specification.

BACKGROUND OF THE INVENTION

1. Field of the Invention

The present invention relates to an Augmented Reality (AR) system and an image display method thereof.

2. Description of Related Art

AR is a technology of calculating a position and angle of an image of a video camera in real time and adding a corresponding image, and this technology is directed to apply a virtual world to the reality on a screen and perform interaction. Generally speaking, AR may be divided into two major stages: a stage of recognizing an image and a stage of superposing a corresponding AR content onto the image for display according to a recognition result.

FIG. 8 is a schematic diagram of a conventional AR technology. Referring to FIG. 8, in the conventional AR technology, image recognition may be performed on an image to determine a position of a maker image 10 in the image, wherein the marker image 10 may be a two-dimensional code, a simple picture or the like. After the position of the marker image 10 is determined, a virtual object 20 may be displayed according to the position of the marker image 10, and then a user may view a scene shown in FIG. 8.

However, for positioning the virtual object to be superposed in the AR scene, these marker images (for example, the white block taken as the marker image 10 in FIG. 8) may usually cover an original reality background to make the whole display image unnatural. Therefore, those skilled in the art work together for an AR image display method capable of preventing a display image from being influenced by a marker image.

SUMMARY OF THE INVENTION

In view of this, the present invention discloses an AR system and an image display method thereof, which may generate an appropriate image to replace a marker image to enable a user to view a more natural AR image.

According to an embodiment of the present invention, the image display method is applied to an AR system which positions a virtual object by a marker image and includes the following steps: a reality image is acquired, wherein the reality image includes a first image where the marker image is positioned and a second image, and the marker image includes a known pattern; the first image in the reality image is replaced with an extending image of the second image on the basis of a relationship between the known pattern and the first image to generate a display image; and the display image is displayed.

The image display method according to the embodiment of the present invention further includes the following step: the virtual object is displayed in the display image according to a position of the first image in the reality image.

In the image display method according to the embodiment of the present invention, the known pattern includes multiple feature points, and the multiple feature points comprise a known position relationship.

In the image display method according to the embodiment of the present invention, the step that the first image in the reality image is replaced with the extending image of the second image on the basis of the relationship between the known pattern and the first image to generate the display image includes the following steps: image recognition is performed on the reality image to recognize the first image, the second image and the multiple feature points in the reality image; and the relationship is found out according to the known position relationship and multiple positions of the multiple feature points in the reality image.

In the image display method according to the embodiment of the present invention, the step that the relationship is found out according to the known position relationship and the multiple positions of the multiple features in the reality image includes the following step: a transformation matrix is established according to the known position relationship and the multiple positions of the multiple feature points in the reality image.

In the image display method according to the embodiment of the present invention, the step that the first image in the reality image is replaced with the extending image of the second image on the basis of the relationship between the known pattern and the first image to generate the display image further includes the following steps: the reality image is transformed by the transformation matrix; a third image is created according to the transformed second image; the transformed first image is replaced with the third image in the transformed reality image to obtain a pre-display image; and the pre-display image is inversely transformed by the transformation matrix to obtain the display image.

In the image display method according to the embodiment of the present invention, the transformation matrix is a homography matrix.

In the image display method according to the embodiment of the present invention, the extending image is the inversely transformed third image.

In the image display method according to the embodiment of the present invention, the step that the third image is created according to the transformed second image includes the following step: a texture synthesis process is performed according to the transformed second image to create the third image.

In the image display method according to the embodiment of the present invention, the extending image is created by a texture synthesis technology.

From another point, an AR system according to an embodiment of the present invention includes an image acquisition device, an image display device and a processor. The image acquisition device is configured to capture a reality image. The processor is coupled to the image acquisition device and the image display device, and is configured to: acquire the reality image, wherein the reality image includes a first image where a marker image is positioned and a second image, and the marker image includes a known pattern; replace the first image in the reality image with an extending image of the second image on the basis of a relationship between the known pattern and the first image to generate a display image; and display the display image through the image display device.

BRIEF DESCRIPTION OF THE DRAWINGS

The accompanying drawings are included to further understand the present invention, and the accompanying drawings are incorporated into the specification and form a part of the specification. The accompanying drawings describe the embodiments of the present invention and are adopted to explain principles of the present invention together with descriptions.

DESCRIPTION OF THE EMBODIMENTS

Reference will now be made in detail to exemplary embodiments of the present invention, examples of which are illustrated in the accompanying drawings. Whenever possible, the same component symbols are adopted to represent the same or similar parts in the accompanying drawings and the description.

Figure 1:
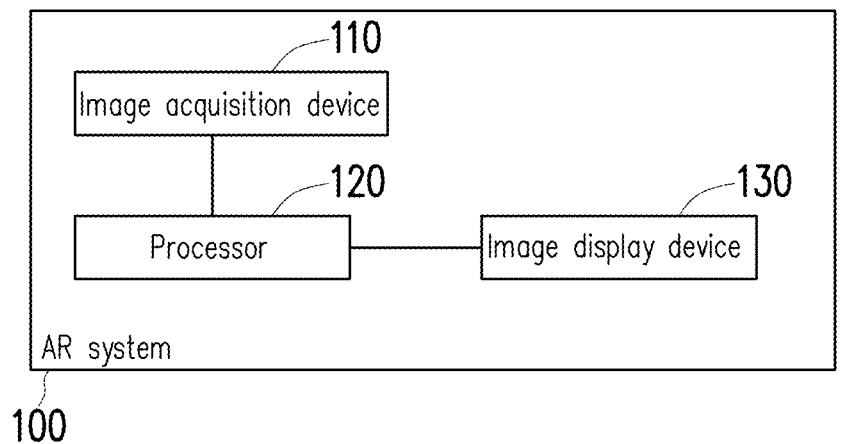
FIG. 1 is a block diagram of an AR system according to an embodiment of the present invention.

FIG. 1 is a block diagram of an AR system according to an embodiment of the present invention.

Referring to FIG. 1, the AR system 100 includes an image acquisition device 110, a processor 120 and an image display device 130, wherein the processor 120 is coupled to the image acquisition device 110 and the image display device 130. The AR system 100 is a system positioning a virtual object by a maker image including a known pattern. Specifically speaking, the processor 120 may perform image recognition on an image shot by the image acquisition device 110 to find a position of a marker image in the image; meanwhile, the processor 120 may parse a virtual object corresponding to the marker image and obtain its three-dimensional spatial position; and then, the processor 120 may superpose the virtual object by referencing a position of the marker image in the image and display it through the image display device 130. In some embodiments, a known pattern of the marker image is, for example, a two-dimensional code or a preset simple picture, which will not be limited in the present invention.

The image acquisition device 110 is configured to capture the image. In some embodiments, the image acquisition device 110 is, for example, a depth camera or a stereo camera or any video camera and camera with a charge coupled device (CCD) lens, a complementary metal oxide semiconductor transistors (CMOS) lens or the like, which will not be limited in the present invention.

The processor 120 is configured to analyze and process the image captured by the image acquisition device 110 and display an AR image through the image display device 130, so as to implement an image display method for the AR system 100. In some embodiments, the processor 120 is, for example, a central processing unit (CPU), other programmable microprocessor for a general purpose or a special purpose, a digital signal processor (DSP), a programmable controller, an application specific integrated circuit (ASIC), a programmable logic device (PLC), a field-programmable gate array (FPGA), other similar device or a combination of these devices, which will not be limited in the present invention.

The image display device 130 is configured to receive an image signal from the processor 120 and correspondingly display the image to enable a user to view the image displayed by the image display device 130. In some embodiments, the image display device is, for example, a flat-panel display such as a liquid crystal display (LCD) or a light emitting diode (LED) display, or a projection display or a soft display, which will not be limited in the present invention.

Figure 2:
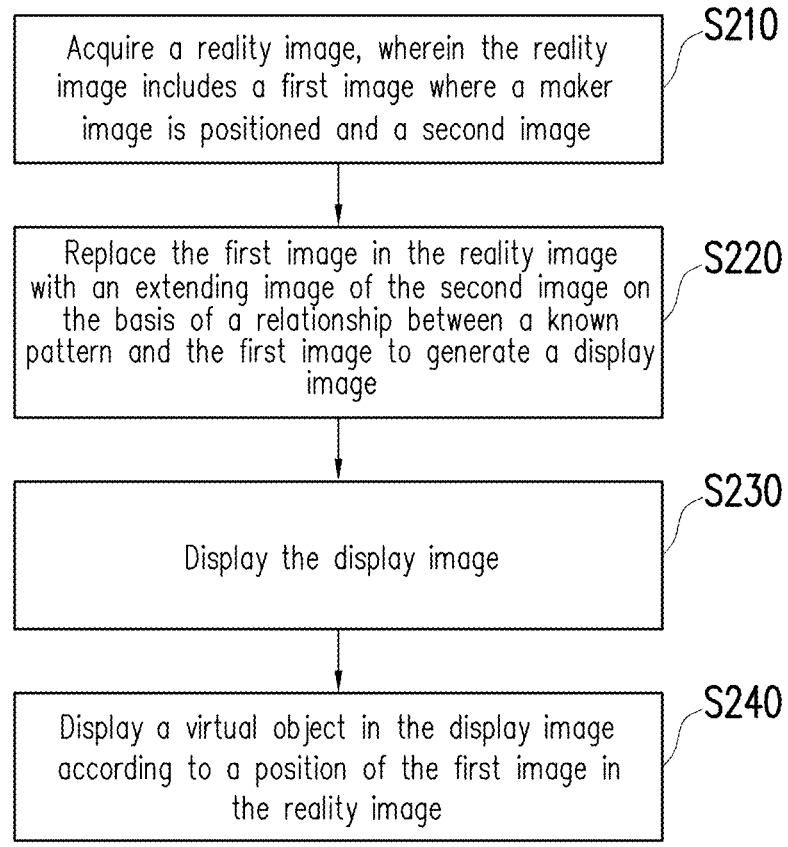
FIG. 2 is a flowchart of an image display method according to an embodiment of the present invention.

FIG. 2 is a flowchart of an image display method according to an embodiment of the present invention.

The image display method in FIG. 2 is applied to an AR system 100 in FIG. 1, so that the image display method in FIG. 2 will be described below with reference to each component of the AR system 100 in FIG. 1.

Referring to FIG. 2, in Step S210, a processor 120 may acquire a reality image, wherein the reality image includes a first image where a marker image is positioned and a second image. Specifically, the processor 120 may shoot through an image acquisition device 110 to acquire the reality image within a field of view of the image acquisition device 110.

Figure 3:
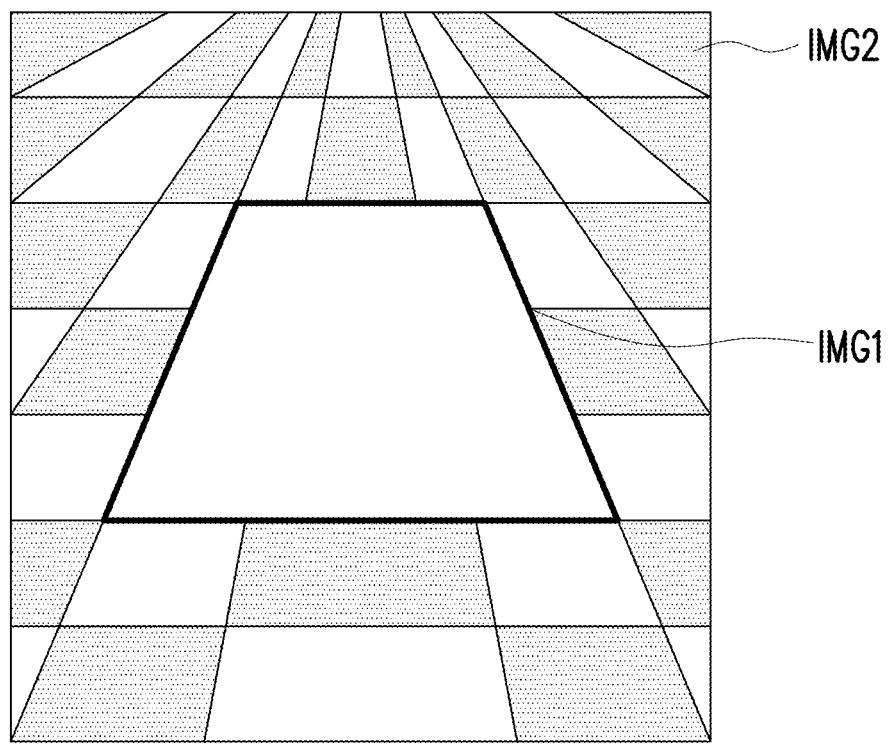
FIG. 3 is a schematic diagram of acquiring a reality image according to an embodiment of the present invention.

In some embodiments, within the range of the field of view of the image acquisition device 110 includes, for example, a desktop in a checkerboard pattern and the marker image arranged on the desktop. Therefore, the image acquisition device 110 may shoot a reality image RI1 shown in FIG. 3, wherein a first image IMG1 where the marker image is positioned and a second image IMG2 including the desktop uncovered by the marker image are included. In the embodiment of FIG. 3, a known pattern of the marker image is, for example, a square two-dimensional code or picture and includes multiple feature points in a known position relationship (for sharp display, contents of the two-dimensional code and the picture are not shown in the figure). It must be noted that the known pattern of the marker image is not limited in the present invention.

It is worth mentioning that, for reasons such as a shooting angle of the image acquisition device 110 and a perspective principle, the first image IMG1 may not be completely the same as the known pattern of the marker image. For example, although the known pattern is square, the first image IMG1 in the reality image RI1 shown in FIG. 3 is displayed as a trapezoid. On the other aspect, if the image acquisition device 110 shoots from another shooting angle, the processor 120 may also acquire a reality image RI2 shown in FIG. 4, wherein a first image IMG1 is displayed as a quadrangle of which any two sides are unparallel.

Referring to FIG. 2, in Step S220, the processor 120 may replace the first image in the reality image with an extending image of the second image on the basis of a relationship between the known pattern and the first image to generate a display image. Specifically, the processor 120 may appropriately extend the second image to fill or replace the first image according to the relationship between the known pattern and the first image to avoid the condition that an AR image includes the marker image and thus the whole image looks unnatural.

Specifically speaking, the processor 120 may perform image recognition on the reality image at first to recognize the first image, the second image and the multiple feature points of the known pattern of the marker image in the reality image. Then, the processor 120 may find out the relationship between the known pattern and the first image according to a known position relationship between the multiple feature points and multiple positions of the multiple feature points in the reality image. In some embodiments, the relationship is represented as, for example, a transformation matrix. Through the transformation matrix, the processor 120 may transform each pixel in the reality image, and the transformed first image may be the same as the known pattern of the marker image. In other words, the transformed reality image may be considered as an image acquired when a lens of the image acquisition device 110 faces the marker image, so that the known pattern of the marker image in the transformed reality image is not distorted.

After the reality image is transformed through the transformation matrix, the processor 120 may perform an image extension or an image expansion according to the transformed second image to create a third image and then replace the transformed first image with the third image in the transformed reality image, so as to obtain a pre-display image including no marker image. Finally, the processor 120 may inversely transform the pre-display image by the transformation matrix to obtain the display image including no marker image. The foregoing flow will be described below with embodiments in FIG. 4, FIG. 5 and FIG. 6 in detail.

Figure 4:
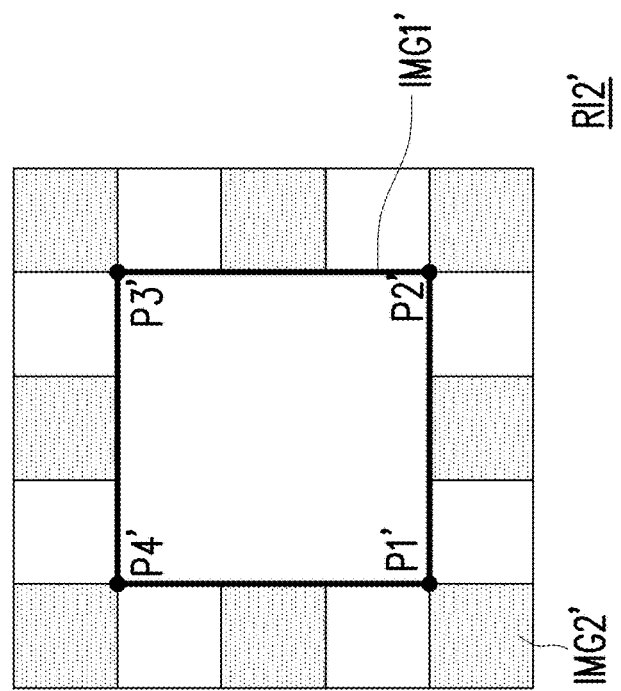
FIG. 4 is a schematic diagram of transforming a reality image according to an embodiment of the present invention.
Figure 4:
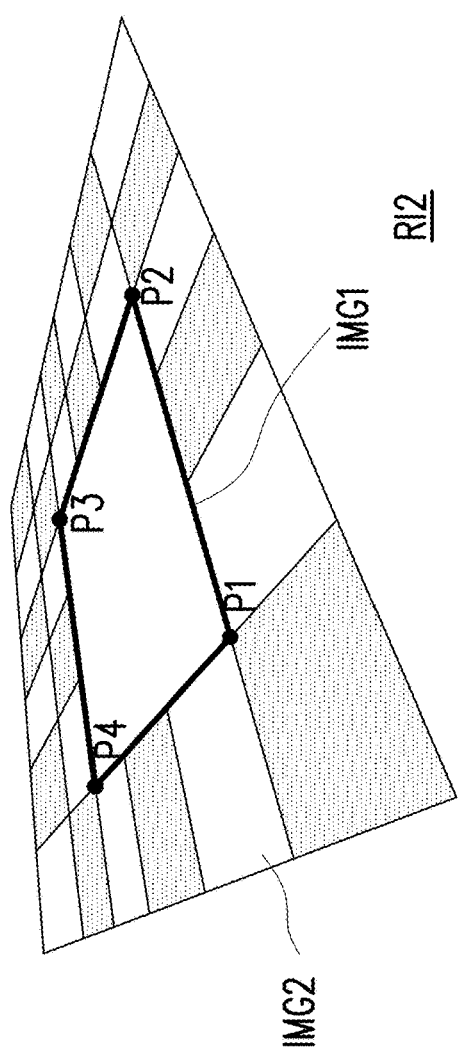

At first, referring to FIG. 4, the processor 120 may perform an image recognition on the reality image RI2 to recognize the first image IMG1, the second image IMG2 and the multiple feature points P1, P2, P3 and P4 of the known pattern of the marker image in the reality image RI2, wherein the multiple feature points of the known pattern are, for example, four angular points of a square, which, however, does not limit the present invention. Then, the processor 120 may establish the transformation matrix according to the known position relationship of the multiple feature points (for example, positions of the four angular points of the known pattern and positions of the multiple feature points P1, P2, P3 and P4 in the reality image RI2 to make the transformed first image IMG' the same as the known pattern after the reality image RI2 is transformed by the transformation matrix.

Specifically speaking, the processor 120 may, for example, set coordinates of the transformed multiple feature points P1', P2', P3' and P4' at first and then obtain the transformation matrix H according to an equation "p'=Hp", where p' is used for representing the coordinates of the transformed multiple feature points P1', P2', P3' and P4', and p is used for representing coordinates of the multiple feature points P1, P2, P3 and P4 in the reality image RI2. In some embodiments, the transformation matrix H is a homography matrix, which, however, does not limit the present invention. It is worth mentioning that, for capable of being solved to obtain the transformation matrix, the number of the feature points is not smaller than 3 in some embodiments. However, the specific number of the feature points will not be limited in the present invention.

As shown in FIG. 4, after the relationship between the known pattern and the first image IMG1 (for example, the transformation matrix H) is obtained, the processor 120 may transform the reality image RI2 by the relationship to obtain the transformed reality image RI2', wherein the transformed first image IMG1' and the transformed IMG2' are included, and the transformed first image IMG1' may be the same as the known pattern of the marker image.

Figure 5:
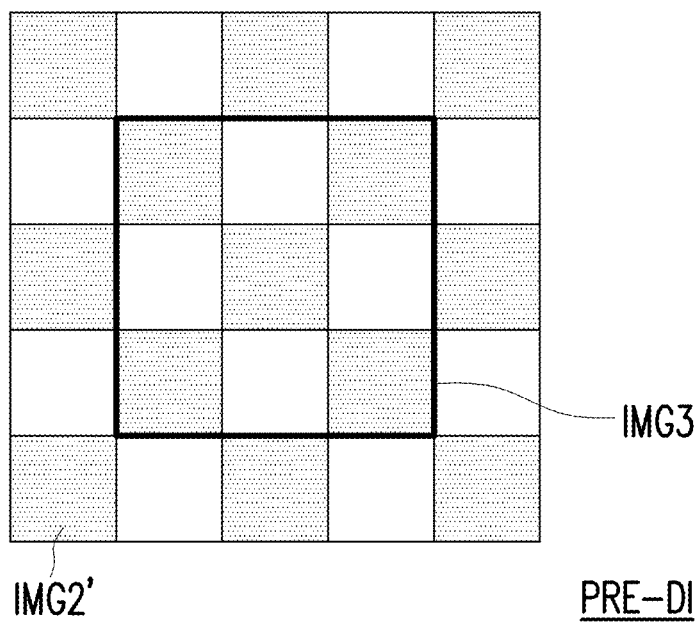
FIG. 5 is a schematic diagram of a pre-display image according to an embodiment of the present invention.

Then, as shown in FIG. 5, the processor 120 may perform the image extension or the image expansion according to the transformed second image IMG2' to create the third image IMG3 and then replace the transformed first image IMG1' with the third image IMG3 in the transformed reality image RI2', so as to obtain the pre-display image PRE-DI including no marker image. In some embodiments, the processor 120 may perform a texture synthesis process to create the third image IMG3 on the basis of, for example, an image content of the transformed second image IMG2'. In some other embodiments, the processor 120 may perform the image extension or the image expansion to create the third image IMG3 by an artificial intelligence algorithm on the basis of the image content of the transformed second image IMG2'. However, specific means of creating the third image IMG3 according to the transformed second image IMG2' will not be limited in the present invention, and those skilled in the art may implement this operation according to a requirement or a capability.

Figure 6:
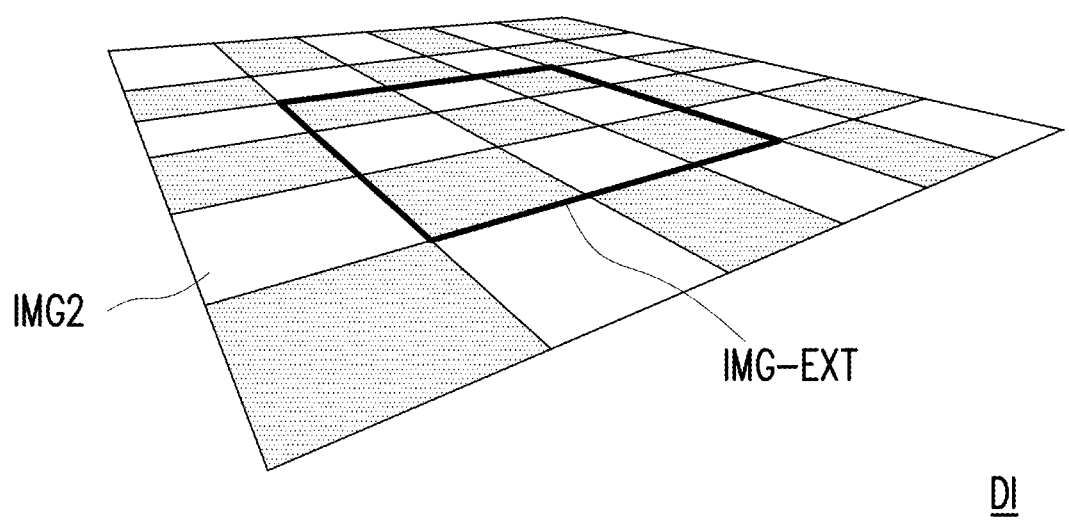
FIG. 6 is a schematic diagram of a display image according to an embodiment of the present invention.

Finally, the processor 120 may inversely transform the pre-display image PRE-DI to obtain the display image DI by the relationship between the known pattern and the first image IMG1 (for example, the transformation matrix H). As shown in FIG. 6, the display image DI includes the second image IMG2 in the reality image RI2 and the extending image IMG-EXT (i.e., an image obtained by inversely transforming the third image IMG3) of the second image IMG2, and the display image DI includes no marker image.

Referring to FIG. 2, in Step S230, the processor 120 may display the display image. Moreover, in Step S240, a virtual object is rendered on the display image according to a position of the first image in the reality image. Specifically, the processor 120 may display the display image and the virtual object through the image display device 130 to prevent the marker image, being utilized to position the virtual object, from being displayed in the AR image.

Figure 7:
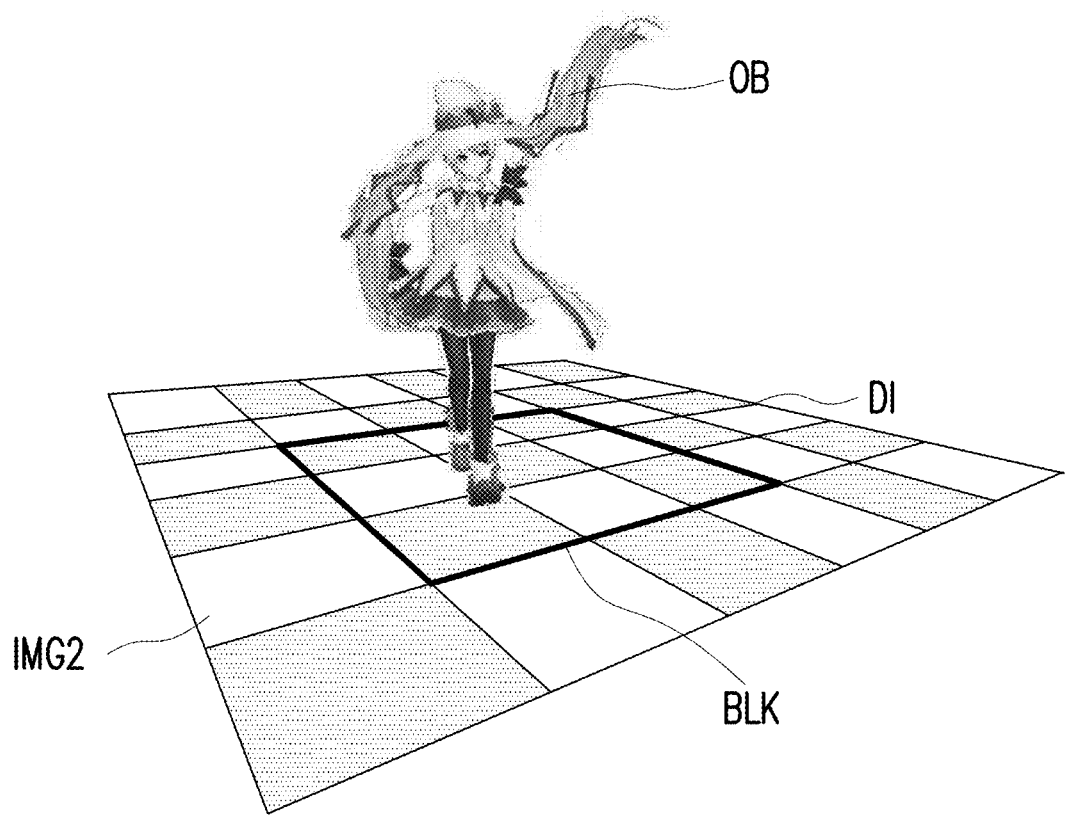
FIG. 7 is a schematic diagram of superposing a virtual object in a display image according to an embodiment of the present invention.
Figure 8:
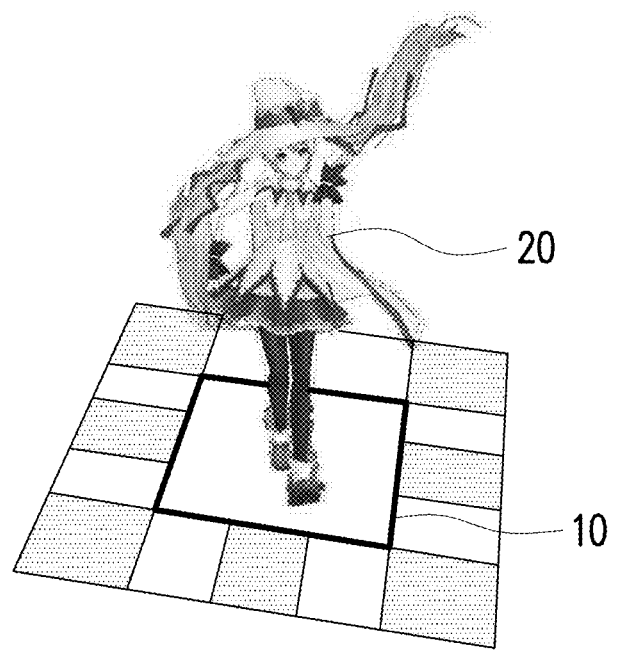
FIG. 8 is a schematic diagram of a conventional AR technology.

Referring to FIG. 4, FIG. 6 and FIG. 7, the processor 120, after acquiring the reality image RI2 including the first image IMG1 where the marker image is positioned, may, for example, generate the display image DI according to the manner introduced above and display it through the image display device 130. Besides displaying the display image DI through the image display device 130, the processor 120 may also render the virtual object OB on the display image DI according to a position BLK of the first image IMG1 in the reality image RI2. In such a manner, the user may view the AR image USER-VIEW, shown in FIG. 7, including both of the display image DI and the virtual object OB through the image display device 130.

In some embodiments, different marker image contents, for example, may correspond to different virtual objects, and the processor 120 may correspondingly render different virtual objects according to the content of the marker image in the reality image.

For example, the marker image in the reality image acquired by the processor 120 is, for example, a two-dimensional code, and the two-dimensional code corresponds to a specific website or file storage address. After acquiring the reality image, the processor 120 may, besides generating the display image DI including no marker image, for example, also be connected to the website or file storage address corresponding to the marker image to obtain the virtual object and then render the obtained virtual object at the position corresponding to the marker image.

For another example, the reality image acquired by the processor 120 includes multiple marker images, for example, two-dimensional codes, and different two-dimensional codes correspond to different websites or file storage addresses respectively. Therefore, after acquiring the reality image, the processor 120 may, besides generating the display image DI including no marker image, for example, also search for a virtual object corresponding to each marker image by the two-dimensional codes and then render the found virtual objects at positions corresponding to the respective marker images respectively.

From the above, according to the AR system and the image display method thereof disclosed in the embodiments of the present invention, the relationship between the marker image in the reality image and the known pattern of the marker image is obtained to appropriately extend a part, except the marker image, in the reality image to cover the marker image in the reality image. Therefore, at the same time of positioning the virtual object by the marker image, display of the marker image in the AR image is avoided, and the AR image looks more natural.

It is important to finally note that: the foregoing embodiments are only adopted to describe the technical solutions of the present invention rather than limiting the present invention; although the present invention is described with reference to each foregoing embodiment in detail, those of ordinary skilled in the art should know that modifications to the technical solutions recorded in each foregoing embodiment or equivalent replacements to part or all of technical features therein are still allowed; and these modifications or replacements do not make the essence of the corresponding technical solutions depart from the scope of the technical solution in each embodiment of the present invention.

What is claimed is:

1. An image display method, applied to an augmented reality system which positions a virtual object by a marker image, the image display method comprising:
    acquiring a reality image, wherein the marker image is arranged on the reality image to divide the reality image into a first image covered by the marker image and a second image uncovered by the marker image, and the marker image comprises a known pattern, wherein the virtual object positioned by the marker image is superposed on the marker image;
    extending the second image on the basis of a relationship between the known pattern and the first image so as to generate an extended image different from the second image;
    replacing an entire region of the first image in the reality image with the extended image different from the second image on the basis of a relationship between the known pattern and the first image to generate a display image; and
    displaying the display image,
    wherein the step of replacing the entire region of the first image in the reality image with the extended image different from the second image on the basis of the relationship between the known pattern and the first image to generate the display image comprises:
        transforming the reality image by a transformation matrix to generate a transformed first image and a transformed second image; and
        replacing the transformed first image with a third image which is created based on the transformed second image.

2. The image display method according to claim 1, further comprising: rendering the virtual object in the display image according to a position of the first image in the reality image.

3. The image display method according to claim 1, wherein the known pattern comprises multiple feature points, and the multiple feature points comprise a known position relationship.

4. The image display method according to claim 3, wherein the step of replacing the entire region of the first image in the reality image with the extended image different from the second image on the basis of the relationship between the known pattern and the first image to generate the display image further comprises:
    performing image recognition on the reality image to recognize the first image, the second image and the multiple feature points in the reality image; and
    finding out the relationship between the known pattern and the first image according to the known position relationship and multiple positions of the multiple feature points in the reality image.

5. The image display method according to claim 4, wherein the step of finding out the relationship between the known pattern and the first image according to the known position relationship and the multiple positions of the multiple features in the reality image comprises:
    establishing the transformation matrix according to the known position relationship and the multiple positions of the multiple feature points in the reality image.

6. The image display method according to claim 5, wherein the step of replacing the entire region of the first image in the reality image with the extended image different from the second image on the basis of the relationship between the known pattern and the first image to generate the display image further comprises:
    generating a pre-display image by replacing the transformed first image with the third image; and
    inversely transforming the pre-display image by the transformation matrix to obtain the display image.

7. The image display method according to claim 6, wherein the transformation matrix is a homography matrix.

8. The image display method according to claim 6, wherein the extended image is an inversely transformed third image.

9. The image display method according to claim 1, wherein the third image is created by performing a texture synthesis process according to the transformed second image.

10. The image display method according to claim 1, wherein the extended image is created by a texture synthesis technology or an artificial intelligence algorithm.

11. An augmented reality system, comprising:
    an image acquisition device, configured to capture a reality image;
    an image display device; and
    a processor, coupled to the image acquisition device and the image display device and configured to:
        acquire the reality image, wherein a marker image is arranged on the reality image to divide the reality image into a first image covered by the marker image and a second image uncovered by the marker image, and the marker image comprises a known pattern, wherein a virtual object is positioned by the marker image and superposed on the marker image;
        extend the second image on the basis of a relationship between the known pattern and the first image so as to generate an extended image different from the second image;

replace an entire region of the first image in the reality image with the extended image different from the second image on the basis of a relationship between the known pattern and the first image to generate a display image; and display the display image through the image display device, wherein when the processor replaces the entire region of the first image in the reality image with the extended image different from the second image on the basis of the relationship between the known pattern and the first image to generate the display image, the following operations are comprised:

transforming the reality image by a transformation matrix to generate a transformed first image and a transformed second image; and replacing the transformed first image with a third image which is created based on the transformed second image.

12. The augmented reality system according to claim 11, wherein the processor is further configured to:

render a virtual object in the display image through the image display device according to a position of the first image in the reality image.

13. The augmented reality system according to claim 11, wherein the known pattern comprises multiple feature points, and the multiple feature points comprise a known position relationship.

14. The augmented reality system according to claim 13, wherein when the processor replaces the entire region of the first image in the reality image with the extended image different from the second image on the basis of the relationship between the known pattern and the first image to generate the display image, the following operations are further comprised:

performing image recognition on the reality image to recognize the first image, the second image and the multiple feature points in the reality image; and finding out the relationship between the known pattern and the first image according to the known position relationship and multiple positions of the multiple feature points in the reality image.

15. The augmented reality system according to claim 14, wherein when the processor finds out the relationship between the known pattern and the first image according to the known position relationship and the multiple positions of the multiple features in the reality image, the following operation is comprised:

establishing the transformation matrix according to the known position relationship and the multiple positions of the multiple feature points in the reality image.

16. The augmented reality system according to claim 15, wherein when the processor replaces the entire region of the first image in the reality image with the extended image different from the second image on the basis of the relationship between the known pattern and the first image to generate the display image, the following operations are further comprised:

generating a pre-display image by replacing the transformed first image with the third image; and inversely transforming the pre-display image by the transformation matrix to obtain the display image.

17. The augmented reality system according to claim 16, wherein the transformation matrix is a homography matrix.

18. The augmented reality system according to claim 16, wherein the extended image is an inversely transformed third image.

19. The augmented reality system according to claim 11, wherein the third image is created by performing a texture synthesis process according to the transformed second image.

20. The augmented reality system according to claim 11, wherein the extended image is created by a texture synthesis technology or an artificial intelligence algorithm.

* * * * *